United States Patent [19]
Sasaki

[11] 3,708,858
[45] Jan. 9, 1973

[54] METHOD FOR PREPARATION OF A FILTER MEDIUM

[76] Inventor: Jiro Sasaki, 2-4067, 2-chome, Ninyo-cho, Nara, Japan

[22] Filed: Jan. 15, 1971

[21] Appl. No.: 106,785

[52] U.S. Cl. ..................29/419, 29/420, 29/163.5
[51] Int. Cl. .........................................B23p 17/00
[58] Field of Search..........29/163.5, 419, 420, 420.5; 264/109, 128; 19/144.5, 144; 210/348; 8/150, 147, 156

[56] References Cited

UNITED STATES PATENTS

| | | | |
|---|---|---|---|
| 1,874,035 | 8/1932 | Fletcher | 29/163.5 R X |
| 3,026,609 | 3/1962 | Bryan | 29/419 |
| 3,026,610 | 3/1962 | Wakefield | 29/419 X |
| 3,182,693 | 5/1965 | Sundberg | 29/419 X |
| 3,562,895 | 2/1971 | Niebergall et al. | 29/419 |

*Primary Examiner*—Charles W. Lanham
*Assistant Examiner*—Victor A. DiPalma
*Attorney*—Dawson, Tilton, Fallon & Lungmus

[57] ABSTRACT

A method for preparation of a filter medium for employing in a precise or super-precise filtering machine with an industrial scale wherein a predetermined amount of fibrous or powder-like raw material is compressed into a predetermined space in dry condition and the thus formed body of said raw material is immersed in a liquid so that a filter medium having intended characteristics is obtained by utilizing the high pressure of swelling caused in said predetermined or defined space and the plasticity of the material. The treated medium body is always kept in wet condition.

8 Claims, 4 Drawing Figures

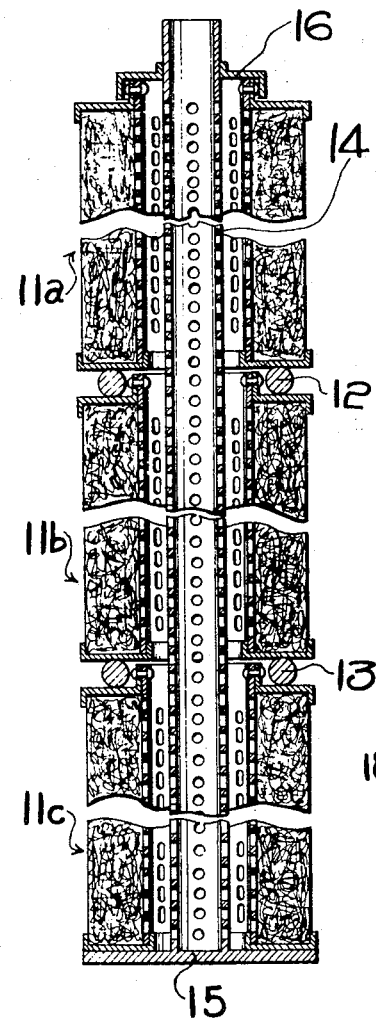
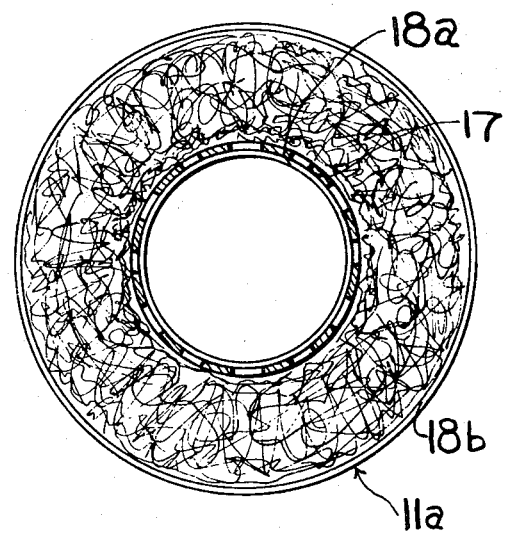
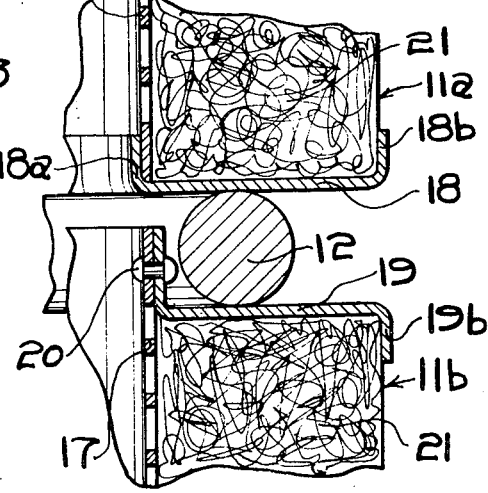

METHOD FOR PREPARATION OF A FILTER MEDIUM

This invention relates to a novel method for preparation of a filter medium, and more particularly to a method for preparation of such a filter medium that is very suitable for employing in a precise filtering machine or apparatus for separating super-fine solid particles having grain sizes of micron or milli-micron order from the liquid to be filtered.

Such super-precise filtration, especially a filtration for separating even bacteria from the liquid to be filtered, has been attempted only in laboratories for the purpose of studying, and a filtering machine or apparatus allowing such precise filtration in an industrial scale has not been proposed yet. The reason for the above mainly consists in the fact that there has not been exploited such a filter medium that allows such super-precise filtration.

Accordingly, the primary object of the present invention is to provide a method for preparation of a filter medium for a super-precise filtering machine or apparatus which medium has a number of super-fine perforations therethrough and is rigid, closely packed, uniform in quality over the medium and simple in construction, whereby a super-precise filtration in an industrial scale is made possible.

The method for preparation of a filter medium for employing in a precise filtering machine or apparatus according to the present invention is characterized in that there is employed as raw material of the medium fine fibers or powder of singular material having swelling ability by absorbing liquid or mixture thereof, and a predetermined amount of said raw material is compressed into a predetermined space in dry condition so as to form a fixed body. The body is immersed into a liquid which gives no trouble in using the medium so that the unevenness of said formed body is corrected so as to regulate the body in quality by utilizing the high pressure of swelling caused in said predetermined or defined space and the plasticity of the material of said body, and the thus treated body is always kept in wet condition. Thus, a filter medium having the aforementioned characteristics can be obtained and said precise or super-precise filtration can be carried out in an industrial scale by employing said filter medium.

The present invention and its attendant advantages will become more readily apparent as the specification is considered in conjunction with the accompanying drawings in which FIG. 1 is a vertical sectional view, partially cut away, of an example of the filter medium which is prepared according to the present invention;

FIG. 3 is a sectional view of the filter medium shown in FIG. 1 taken along line III—III of FIG. 2 in which the central tube is also omitted;

FIG. 4 is an enlarged vertical sectional view of the filter medium shown in FIG. 1.

Figure 2:
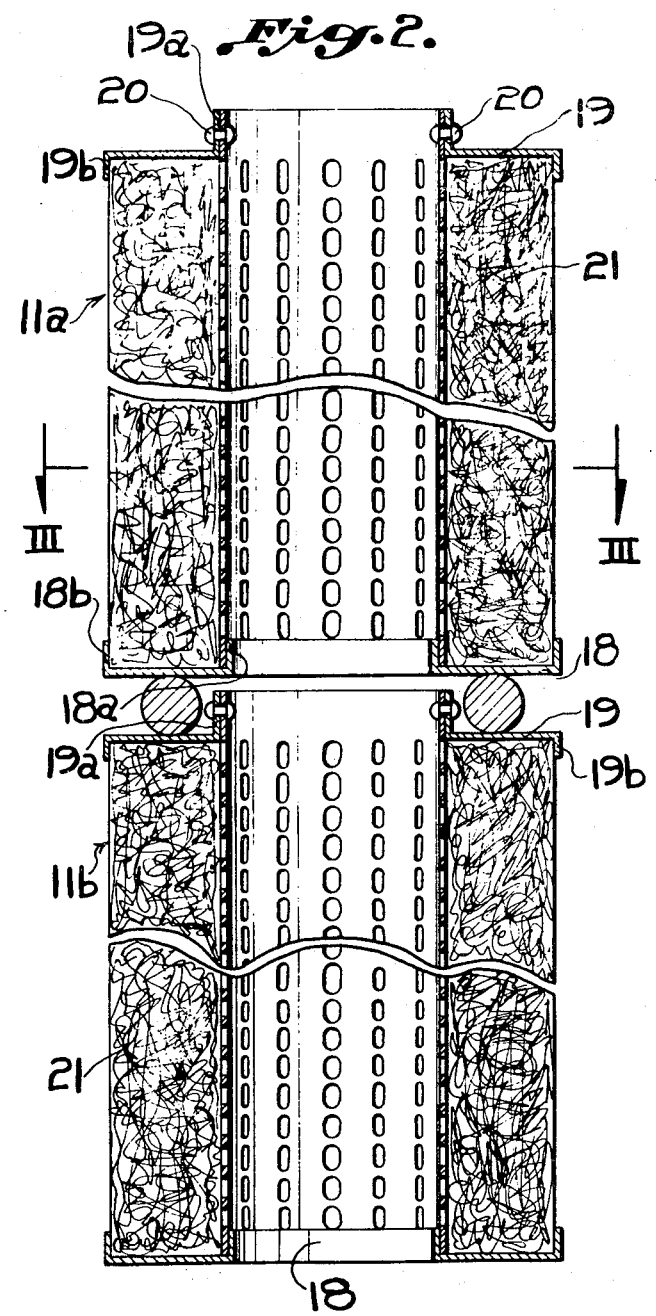
FIG. 2 is an enlarged sectional view, partially cut away, of a part of the filter medium shown in FIG. 1 in which a central tube is omitted.

Referring now to the drawings, in which like numerals designate like parts throughout the several views thereof, there is shown an example of the filter medium which is prepared according to the present invention in FIGS. 1 through 4. As shown in FIG. 1, the filter medium is composed of three sets of filter medium units 11a, 11b and 11c having the same construction and there are provided annular packing members 12 and 13 for sealing between the units 11a and 11b and between the units 11b and 11c respectively. At the center of the medium, there is provided a vertical central tube 14 having innumerable perforations therethrough, the bottom end of which is secured to a bottom plate member 15 and the top portion of which is inserted into and secured to a cover 16. The units 11a, 11b and 11c are tightened between the bottom plate member 15 and the cover 16 with suitable means (not shown in the drawings).

Each filter medium unit 11a, 11b or 11c comprises a perforated tube 17, a lower annular supporting member 18 having an inner annular projection 18a upwardly projected and secured to the inner face of said perforated tube 17 by welding, an outer annular projection 18b upwardly projected and defining the outer face of medium material 21, an upper annular supporting member 19 having an inner annular projection 19a upwardly projected and secured to the outer face of the perforated tube 17 with rivets 20, and an outer annular projection 19b downwardly projected and defining the outer face of the medium material 21. The medium material 21 is accommodated between said lower and upper supporting members 18 and 29 and is in contact with the outer circumference of the perforated tube 17.

Said medium material consists of cotton fibers, synthetic or chemical fibers, pulp powder or the like in the form of singular material or mixture thereof, and the formed material 21 has, for example, thickness of 10–30 mm, porosity of 30–70 percent and a number of uniformly distributed perforations with diameters of 0.1–5 micron.

The medium material 21 is prepared as follows: There is employed as raw material fine fibers or fine powder of singular material or mixture thereof which material has good swelling ability when immersed in liquid. An example of said material consists of a mixture of sufficiently leached cotton fibers with diameters of about 1–2 micron and chemical fibers with diameters of about 2–3 micron in a suitable mixing ration according to the use of prepared medium. Said raw material is used in such a predetermined amount that desired or intended degree of packing, porosity, diameters of perforations and the like of the medium is obtained when said amount of the material is compressed into a predetermined space and is then immersed into a liquid. Said amount of the raw material is then compressed into said predetermined space, and then the formed body of the material is brought around the perforated tube 17 and is tightened between the lower and upper supporting members 18 and 19. Then, said fixed body is immersed sufficiently into a liquid which gives no trouble in using the filter medium, for example in water or beer when the completed medium is used for filtering water or beer, or in an oil when oil with similar nature is intended to be filtered by using the completed filter medium.

When the fixed body of the material is immersed in the liquid, the fine fibers or powder of said material are swelled by absorbing the liquid. Said swelling of the material is really caused in the predetermined or defined space so that the pressure of the swelling acts effectively upon the material. Mechanical or physical unevenness of the fixed body caused by the compression process of the material thereby becomes corrected so as to regulate the body in quality, said formed body becomes highly packed and hard, and fine perforations of the formed body becomes much finer and nearly uniformly distributed.

Needless to say, the liquid for immersing the formed body is selected from the ones which allow a sufficient occurrence of the above phenomena in the body. As occasion demands, however, said immersing liquid may be warmed or may be added with a suitable surface-active agent. Further, the immersing liquid is sufficiently purified previously so as to remove bacteria when the completed filter medium is used for separating bacteria from the liquid to be filtered.

The thus obtained filter medium is stored hermetically in the same liquid with said immersing liquid or in a gas so as to keep the wet condition of the medium. In the case of the medium material 21 of organic substance which has a fear or putrefaction or failing in quality, if is stored hermetically in a sealed room where no bacteria exist.

As detailed hereinbefore, in the method for preparation of a filter medium according to the present invention, the formed body of medium material is regulated in quality by utilizing the swelling caused in a defined space and the plasticity of said medium material so that the pressure of said swelling acts effectively upon each of the medium material with plasticity, whereby mechanical or physical local unevenness caused by the previous compression process is corrected or removed very effectively, the formed body becomes highly packed and hard, and further fine perforations in the unimmersed body becomes narrowed so as to obtain nearly uniformly distributed super-fine perforations. Further, by selecting the sort of the aforementioned fine fibers or powder, and diameter and length of said fibers or grain sizes of said powder according to the given conditions of intended precise filteration, namely the sort of the liquid to be filtered, the sort, grain sizes and concentration of impurities contained in said liquid, intended purification degree, the capacity of filtering machine and the like by employing said raw material in a suitable amount according to said given conditions of the filtration, and by compressing said amount of the material into a suitable defined space according to said conditions of the filtration, there can be obtained or prepared a uniform filter medium which is adjusted to said conditions of filtration or to the desired purpose. The most important advantage of the present invention consists in the fact that a filter medium for employing in a precise or super-precise filtering machine can be prepared in a very simple and economical manner so that such precise or super-precise filtration can now be carried out in an industrial scale. In addition, precise classification of the filter medium, which is difficult according to the prior art, can easily be achieved by estimating the absorbing rate and absorbed amount of the immersing liquid into the medium material, that is clearly one of the advantages of the present invention.

Having now described the invention and having exemplified the manner in which it can be carried into practice, it is apparent to those skilled in the art that innumerable variations, applications, and modifications of the basic principles involved may be made without departing from the spirit of the present invention. The invention is, therefore, to be limited only by the scope of the appended claims.

I claim:

1. A method for preparation of a filter medium for a super-precise filtration comprising the steps of compressing under dry conditions a swellable material into a body confined within a container, the swellable material comprising a quantity of swellable fibers such as cotton, synthetic or chemical fiber or swellable powder such as pulp powder or the like or a mixture thereof, dipping the body and the container into a liquid which does not impair the filtration of the body to swell the swellable material confined within the container so that the pressure of swelling corrects mechanical or physical unevenness in the distribution of pores and the density of the swellable material caused during compression of the material, and maintaining the body in wet condition by storing the body and the container in a liquid or a gas which does not impair the filtration of the body.

2. The method of claim 1 in which the swellable material is leached sufficiently to avoid contamination of the liquid to be filtered.

3. The method of claim 1 in which the liquid into which the body and the container are dipped is the same liquid which is intended to be filtered by the filter medium.

4. The method of claim 1 in which the liquid into which the body and the container are dipped is warmed to increase the pressure of swelling of the swellable material within the container.

5. The method of claim 1 in which a surface-active agent is added to the liquid into which the body and the container are dipped to increase the swelling of the swellable material.

6. The method of claim 1 in which the liquid into which the body and the container are dipped is first purified to eliminate bacteria.

7. The method of claim 1 in which the body is maintained in wet condition by storing the body and the container in a hermetically sealed bacteria-free room.

8. The method of claim 1 in which the body is maintained in wet condition by storing the body and the container in the same liquid as the liquid into which the body and the container are dipped.

* * * * *